United States Patent
Duque et al.

(10) Patent No.: US 9,416,539 B2
(45) Date of Patent: *Aug. 16, 2016

(54) ROOFING SHINGLE SYSTEM AND SHINGLES FOR USE THEREIN

(71) Applicant: Building Materials Investment Corporation, Dallas, TX (US)

(72) Inventors: Luis Duque, Hackensack, NJ (US); Ming-Liang Shiao, Collegeville, PA (US); Sudhir Railkar, Wayne, NJ (US); Olan Leitch, Bakersfield, CA (US)

(73) Assignee: Building Materials Investment Corporation, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/550,468

(22) Filed: Nov. 21, 2014

(65) Prior Publication Data

US 2016/0145868 A1    May 26, 2016

(51) Int. Cl.
*E04D 1/12* (2006.01)
*B32B 11/12* (2006.01)
*E04F 13/08* (2006.01)
(Continued)

(52) U.S. Cl.
CPC . *E04D 1/12* (2013.01); *B32B 11/02* (2013.01); *B32B 11/12* (2013.01); *E04D 1/20* (2013.01); *E04D 1/26* (2013.01); *E04D 1/28* (2013.01); *E04F 13/0862* (2013.01); *E04F 13/0864* (2013.01)

(58) Field of Classification Search
CPC .............. E04D 1/12; E04D 1/26; E04D 1/20; E04D 1/28; E04D 2001/3458; E04D 1/00; E04D 2001/3461; E04D 2001/3491; E04F 13/0864; E04F 13/0862; B32B 11/00; B32B 11/12; B32B 11/10; B32B 11/02
USPC ........... 52/554, 531, 518, 519, 523, 524, 529; D25/139, 140, 144

See application file for complete search history.

(56) References Cited

U.S. PATENT DOCUMENTS

| 433,279 A | 7/1890 | Fairchild |
| 1,295,360 A | 2/1919 | Overbury |

(Continued)

OTHER PUBLICATIONS

CertainTeed Shingle Applicator's Manual: Presidential Shake and Presidential Shake TL, http://www.certainteed.com/resources/PresidentialShakeTLInstall.pdf (undated).

(Continued)

*Primary Examiner* — Joshua J Michener
*Assistant Examiner* — Matthew Gitlin
(74) *Attorney, Agent, or Firm* — Fitzpatrick, Cella, Harper & Scinto (57) ABSTRACT

A roofing system and roofing shingles for use therein are disclosed. The roofing system comprises a multiplicity of courses of roofing shingles having a headlap portion, a buttlap portion, a lateral leading edge, and a lateral trailing edge, wherein the headlap portion has a width that is less than a width of the buttlap portion defining a reduced-width headlap, wherein the lateral trailing edge of a shingle in a course partially overlaps and partially abuts the lateral leading edge of an adjacent previously installed shingle to form an interlocking edge between adjacent shingles in the course, and wherein the lateral edge includes a trailing edge projection having a weather edge, a rear edge, and a variable breadth that increases toward the rear edge of the trailing edge projection.

35 Claims, 8 Drawing Sheets

(51) Int. Cl.
  *B32B 11/02* (2006.01)
  *E04D 1/20* (2006.01)
  *E04D 1/28* (2006.01)
  *E04D 1/26* (2006.01)

(56) References Cited

U.S. PATENT DOCUMENTS

| | | | |
|---|---|---|---|
| D56,106 S | 8/1920 | Russell | |
| 1,442,614 A | 1/1923 | Hooker | |
| 1,463,632 A | 7/1923 | Severns | |
| 1,513,940 A | 11/1924 | Smith et al. | |
| D68,552 S | 10/1925 | Sjodahl | |
| 1,584,343 A | 5/1926 | Abraham | |
| 1,587,017 A | 6/1926 | MacInnes | |
| 1,601,735 A | 10/1926 | Harris | |
| 1,604,339 A | 10/1926 | Cumfer | |
| 1,619,599 A | 3/1927 | Cumfer | |
| 1,633,474 A | 6/1927 | Busha | |
| 1,641,858 A | 9/1927 | McCarthy | |
| 1,655,885 A | 1/1928 | Adair | |
| 1,656,434 A | 1/1928 | Gietz | |
| D74,669 S | 3/1928 | Fife | |
| D75,612 S | 6/1928 | Cotner | |
| 1,688,917 A | 10/1928 | Busha | |
| D76,843 S | 11/1928 | Topping | |
| 1,698,891 A | 1/1929 | Overbury | |
| 1,555,441 A | 9/1929 | Sjodahl | |
| 1,732,403 A | 10/1929 | Harris et al. | |
| 1,741,539 A | 12/1929 | Moore | |
| 1,756,741 A * | 4/1930 | Harshberger | E04D 1/26 52/524 |
| 1,760,873 A | 6/1930 | Kirschbraun | |
| D81,768 S | 8/1930 | Topping | |
| D83,704 S | 3/1931 | Stark | |
| 1,828,222 A * | 10/1931 | Clow | E04D 1/22 52/525 |
| D85,639 S * | 12/1931 | Finley | 52/554 |
| 1,842,761 A * | 1/1932 | McCarthy | E04D 1/22 52/527 |
| 1,843,370 A | 2/1932 | Overbury | |
| 1,846,635 A | 2/1932 | Finley | |
| 1,851,088 A | 3/1932 | Duncan | |
| 1,860,899 A | 5/1932 | Miller | |
| 1,862,852 A | 6/1932 | Harshberger | |
| 1,871,646 A | 8/1932 | Abraham | |
| 1,894,614 A | 1/1933 | Wettlaufer | |
| D89,783 S | 5/1933 | Moone | |
| 1,934,666 A | 11/1933 | Goslin | |
| 1,945,485 A | 1/1934 | Harshberger | |
| 1,955,699 A | 4/1934 | Moffit | |
| 1,956,732 A * | 5/1934 | Schulz | E04D 1/26 52/526 |
| D92,504 S | 6/1934 | Topping | |
| 1,968,426 A | 7/1934 | Rowe | |
| 1,975,487 A | 10/1934 | Topping | |
| D93,824 S | 11/1934 | Harshberger | |
| 1,983,936 A * | 12/1934 | Dozier | E04D 1/22 52/525 |
| 2,000,226 A | 5/1935 | Fry | |
| 2,006,417 A | 7/1935 | Topping | |
| 2,018,722 A | 10/1935 | Humphrey | |
| 2,027,029 A | 1/1936 | Eckert | |
| D99,248 S | 4/1936 | Piazza | |
| 2,068,118 A | 1/1937 | Topping | |
| 2,078,998 A | 5/1937 | Black | |
| D107,209 S * | 11/1937 | Batell | D25/139 |
| 2,099,131 A | 11/1937 | Miller | |
| 2,106,396 A | 1/1938 | Topping | |
| 2,113,644 A | 4/1938 | Bollaert | |
| 2,132,999 A * | 10/1938 | Topping | E04D 1/26 428/101 |
| 2,161,440 A | 6/1939 | Venrick | |
| 2,205,679 A | 6/1940 | Ames, Jr. | |
| 2,219,450 A | 10/1940 | Koenig | |
| 2,257,152 A * | 9/1941 | Black | E04D 1/125 52/525 |
| 2,272,032 A | 2/1942 | Brown | |
| 2,335,493 A | 11/1943 | Drinkall | |
| 2,411,308 A * | 11/1946 | Washburn | E04D 1/20 52/105 |
| 2,460,353 A | 2/1949 | Killingsworth | |
| 2,487,593 A | 11/1949 | Rowe | |
| 2,687,701 A | 8/1954 | Abraham | |
| 2,699,129 A * | 1/1955 | Abraham | E04D 1/22 52/523 |
| 2,756,699 A | 7/1956 | Lockwood | |
| 2,808,010 A | 10/1957 | Rannikko | |
| 2,858,777 A | 11/1958 | Schuetz | |
| 2,867,180 A | 1/1959 | May | |
| 2,884,878 A * | 5/1959 | Abraham | E04D 1/26 52/525 |
| 3,127,701 A * | 4/1964 | Jastrzemski | E04D 1/20 52/478 |
| 3,217,870 A | 11/1965 | Davis et al. | |
| 3,283,463 A | 11/1966 | Powell | |
| 3,377,761 A | 4/1968 | Skelton, Jr. | |
| 3,407,556 A | 10/1968 | Leibrook | |
| 3,638,388 A | 2/1972 | Crookston | |
| 3,919,223 A | 11/1975 | Zmojdzin et al. | |
| 3,919,823 A | 11/1975 | Bradley | |
| 3,921,358 A | 11/1975 | Bettoli | |
| 4,188,763 A | 2/1980 | Thiis-Evensen | |
| 4,195,461 A | 4/1980 | Thiis-Evensen | |
| 4,274,243 A | 6/1981 | Corbin et al. | |
| 4,333,279 A | 6/1982 | Corbin et al. | |
| 4,434,589 A | 3/1984 | Freiborg | |
| 4,499,702 A | 2/1985 | Turner | |
| 4,527,374 A | 7/1985 | Corbin | |
| 4,587,785 A | 5/1986 | Rohner | |
| 4,637,191 A * | 1/1987 | Smith | E04D 1/26 52/522 |
| 4,666,226 A | 5/1987 | Legrand et al. | |
| 4,856,251 A | 8/1989 | Buck | |
| D317,506 S | 6/1991 | Jenkins et al. | |
| D326,330 S | 5/1992 | Klein | |
| 5,195,290 A * | 3/1993 | Hulett | E04D 1/26 52/518 |
| 5,232,530 A | 8/1993 | Malmquist et al. | |
| 5,239,802 A * | 8/1993 | Robinson | E04D 1/26 52/518 |
| 5,421,134 A | 6/1995 | Hannah et al. | |
| D366,124 S | 1/1996 | Hannah et al. | |
| 5,495,654 A * | 3/1996 | Goodhart | E04D 1/06 29/428 |
| 5,657,603 A * | 8/1997 | Goodhart | E04D 1/06 52/519 |
| D388,195 S | 12/1997 | Hannah et al. | |
| 5,799,459 A * | 9/1998 | Covert | E04D 1/265 156/295 |
| 5,816,014 A | 10/1998 | Tzeng et al. | |
| D400,981 S | 11/1998 | Bondoc et al. | |
| 5,853,858 A | 12/1998 | Bondoc | |
| 5,860,263 A * | 1/1999 | Sieling | E04D 1/26 52/518 |
| D406,361 S | 3/1999 | Bondoc et al. | |
| D406,665 S | 3/1999 | Bondoc et al. | |
| 5,939,169 A | 8/1999 | Bondoc et al. | |
| 6,014,847 A | 1/2000 | Phillips | |
| D426,002 S | 5/2000 | Bondoc et al. | |
| D435,671 S | 12/2000 | Phillips | |
| 6,190,754 B1 | 2/2001 | Bondoc et al. | |
| 6,361,851 B1 * | 3/2002 | Sieling | B32B 3/02 428/141 |
| 6,367,222 B1 | 4/2002 | Timbrel et al. | |
| D480,485 S | 10/2003 | Phillips | |
| D482,141 S | 11/2003 | Rodrigues et al. | |
| D484,992 S | 1/2004 | Rodrigues et al. | |
| 6,708,456 B2 | 3/2004 | Kiik et al. | |
| 6,920,730 B2 | 7/2005 | Becker et al. | |
| 6,990,779 B2 | 1/2006 | Kiik et al. | |
| 7,204,063 B2 | 4/2007 | Kandalgaonkar | |
| 7,510,622 B2 | 3/2009 | Kalkanoglu et al. | |
| 7,607,275 B2 | 10/2009 | Elliot et al. | |

(56) References Cited

U.S. PATENT DOCUMENTS

| | | |
|---|---|---|
| 7,775,008 B2 | 8/2010 | King |
| D658,787 S | 5/2012 | Westfall et al. |
| D666,745 S | 9/2012 | Rodrigues et al. |
| D666,747 S * | 9/2012 | Rodrigues ................ B26D 5/34 D25/143 |
| D670,407 S | 11/2012 | Leitch |
| D670,408 S | 11/2012 | Leitch |
| D670,409 S | 11/2012 | Leitch |
| D670,825 S | 11/2012 | Leitch |
| D670,826 S | 11/2012 | Leitch |
| D670,827 S | 11/2012 | Leitch |
| D674,515 S | 1/2013 | Jenkins |
| D695,925 S | 12/2013 | Ray et al. |
| 9,057,194 B2 | 6/2015 | Jenkins et al. |
| 9,242,432 B1 | 1/2016 | Harrington et al. |
| 2003/0110729 A1 | 6/2003 | Waggoner et al. |
| 2003/0172611 A1 | 9/2003 | Coco et al. |
| 2004/0079042 A1 | 4/2004 | Elliott |
| 2004/0172909 A1 * | 9/2004 | Gabbard ................ E04D 1/265 52/535 |
| 2004/0182032 A1 | 9/2004 | Koschitzky |
| 2007/0068108 A1 | 3/2007 | Kiik et al. |
| 2009/0100788 A1 * | 4/2009 | Gabbard ................ E04D 1/265 52/745.19 |
| 2009/0151288 A1 * | 6/2009 | Kalkanoglu ............. B26D 5/34 52/554 |
| 2009/0229210 A1 | 9/2009 | Binkley et al. |
| 2011/0185668 A1 | 8/2011 | Kiik et al. |
| 2013/0160389 A1 | 6/2013 | Leitch |

OTHER PUBLICATIONS

Pending U.S. Appl. No. 14/656,902, filed Mar. 13, 2015 (drawings attached).
Pending U.S. Appl. No. 29/520,321, filed Mar. 13, 2015 (drawings attached).
Pending U.S. Appl. No. 29/520,322, filed Mar. 13, 2015 (drawings attached).
Pending U.S. Appl. No. 29/520,324, filed Mar. 13, 2015 (drawings attached).
Pending U.S. Appl. No. 14/947,220, filed Nov. 20, 2015 (drawings attached).

* cited by examiner

ROOFING SHINGLE SYSTEM AND SHINGLES FOR USE THEREIN

FIELD OF THE INVENTION

This invention relates to an improved roofing system and roofing shingles that may be utilized in the roofing system. In particular, the invention relates to roofing shingles featuring unique dimensions and a roofing system that utilizes the shingles.

BACKGROUND OF THE INVENTION

Roofing products are often divided into three broad groups: shingles, roll roofing, and underlayment. Shingles and roll roofing typically function as outer roof coverings designed to withstand exposure to weather and the elements. Shingles and roll roofing generally contain the same basic components which provide protection and long term wear associated with asphalt roofing products. These components include a base material made from an organic felt or fiberglass mat which serves as a matrix to support the other components and gives the product the required strength to withstand manufacturing, handling, installation and service in the intended environment. An asphalt coating formulated for the particular service application is often applied to the base material to provide the desired long-term ability to resist weathering and to provide stability under temperature extremes. An outer layer of mineral granules is also commonly applied to the asphalt coating to form a surface exposed to the weather which shields the asphalt coating from the sun's rays, adds color to the final product and provides fire resistance.

Typically, shingles are installed on a roof deck such that the shingles are in a row from left to right and the lateral edges of the shingles in the row are contiguous with each other so as to abut each other, i.e. their lateral edges are adjacent to one another. Each row represents a course and the shingles are applied in overlapping courses on the roof deck, wherein the buttlap portion of a subsequent course is placed on the headlap portion of a previous course. The headlap portion of a conventional shingle is at least as wide as the buttlap portion of the shingle so that when the shingles are installed on a roof deck in overlapping courses, the entire buttlap portion of a subsequent course has headlap beneath it. This manner of installation prevents leakage to the roof deck where the lateral edges of the shingles abut each other.

In a typical roofing system, contiguous shingles in a row abut each other at their lateral edges. Thus, when the shingles are exposed to wet weather, it is possible that leakage can occur at the region where the shingles abut. To prevent that, overlapping subsequent rows of shingles are installed in an offset pattern and each shingle's headlap portion is at least as wide as the buttlap portion. Thus, when the shingles are applied to the roof in a plurality of courses and the buttlap portion of a second course of shingles is laid over the headlap portion of a first row of shingles there is always headlap present underneath the regions where the contiguous shingles in a row abut. Any water penetrating the places where lateral edges of shingles abut contacts the underlying headlap rather than the roof deck.

Asphalt shingles are among the most commonly used roofing materials. Asphalt shingles, such as those disclosed in U.S. Pat. No. 6,990,779, have been used extensively in residential housing as roof covering due to their aesthetics, ease of installation, water shedding function, and excellent field performance over a long period of time. U.S. Pat. No. 6,990,779 discloses a laminated roofing shingle system including a reduced-width headlap portion and an interply material that is installed under the buttlap portion in order to compensate for the reduced-width headlap portion and provide protection to the roof deck.

In some cases, prior art shingles may rely on redundant overlapping to ensure adequate water shedding performance, particularly in high wind or wind-driven rain conditions. For example, a typical prior art shingle know as a "3-tab shingle" would require approximately 240 ft$^2$ of sheet material to cover a 100 ft$^2$ of roof area (also known as a "square"). Other types of shingles also require significantly high amounts of overlapping materials to achieve adequate performance for resistance to water infiltration.

Various shingles have been developed that employ a shiplap or side-lap feature such that when applied to a roof deck at least part of the lateral edges of neighboring shingles overlap. U.S. Pat. No. 2,106,396 discloses single layer asphalt coated shingles having serrated edges having edge and corner elements. When the shingles are applied to a roof deck, their lateral edges overlap. The edge and corner elements of the shingles may be utilized as guides for laying the elements of each shingle in proper relation to each other in each course and also for properly relating the elements in one course to those in a subjacent course.

U.S. Pat. No. 2,687,701 discloses single layer tabbed asbestos cement roofing shingles comprising projections on the front and rear edges. When the shingles are applied to a roof deck, their lateral edges overlap. The shingles comprise projections which extend above and over the buttlap portion of a previous course when a subsequent course is installed. The overlapping and projections are intended to create a more dimensional appearance.

U.S. Pat. No. 3,919,823 discloses single layer asphalt roofing shingles. The shingles comprise various projections on the front edge. The shingles are installed such that their lateral edges overlap to create what is described as a "shadow effect" which will vary depending on the time of day.

U.S. Pat. No. 4,274,243 discloses a laminated asphalt roofing shingle to be arranged in overlapping courses to optically simulate tiles. The shingle has a buttlap portion with curved tile-like features and the left-most tile-like feature includes an overlap portion that extends over the adjoining edge of a neighboring shingle to hide the adjoining edge between the shingles.

U.S. Pat. Nos. 4,333,279 and 4,527,374 disclose strip or tabbed single layer asphalt shingles. The shingles comprise various edges at least one of which is an alignment edge. The shingles are overlapped using the alignment edge in order to achieve a desired pattern when the shingles are installed on a roof deck.

U.S. Pat. Appl. Publ. No. 2004/0182032 discloses a multi-layer laminate shingle with a reduced-width headlap portion. The shingle has a base layer and at least a second layer above the base layer. At one end of the shingle the base layer projects beyond the second layer while at the other end the second layer projects beyond the base layer. When the shingles are laid in a course along the roof, the projecting end of the second layer overlaps the projecting end of the base layer of the previously installed shingle, forming a shiplap joint over all or substantially all of the width of the shingle.

U.S. Pat. Appl. Publ. No. 2011/0185668 discloses a laminated roofing shingle system including a reduced-width headlap portion, wherein the roofing system comprises a plurality of courses, and wherein a trailing edge of a subsequently installed shingle in a course overlaps the leading edge of an adjacent previously installed shingle in the same course.

Each of the above-referenced patents and patent applications is incorporated herein by reference in its entirety for all purposes within this application.

SUMMARY OF THE INVENTION

In accordance with the present invention, a roofing system is provided having a multiplicity of courses of roofing shingles having a reduced-width headlap portion wherein a lateral trailing edge of a shingle in a single course partially overlaps and partially abuts an adjacent previously installed shingle to form an interlocking edge between adjacent shingles, and wherein the lateral trailing edge includes a trailing edge projection having a weather edge, a rear edge, and a variable breadth that increases toward the rear edge of the trailing edge projection.

One embodiment of this invention pertains to a new asphalt containing roofing shingle that improves upon the utilization of materials required to make the shingle compared to prior art shingles while providing excellent water shedding and resistance to water infiltration under high wind conditions.

A preferred embodiment of the present invention pertains to a shingle, wherein the shingle has a trailing edge projection having a continuously curved shape to dissipate wind impingements. When installed on a roof deck, the trailing edge projection forms at least part of a side-lap (or shiplap) region. The trailing edge projection in accordance with the invention greatly improves wind performance of the side-lap region.

A further preferred embodiment of the present invention pertains to a shingle, wherein the shingle has a leading edge projection and leading abutment portions that, when installed on a roof deck, abut trailing abutment portions of an adjacent subsequently installed shingle in the same course. The leading edge projection in accordance with the invention greatly improves water infiltration underneath a trailing lateral edge of the adjacent subsequently installed shingle.

In a preferred embodiment, a roofing system is provided comprising single-layer shingles having a headlap portion, a buttlap portion, a lateral leading edge, and a lateral trailing edge, wherein the headlap portion has a maximum headlap width that is less than a maximum buttlap width of the buttlap portion, wherein the lateral leading edge includes at least one leading abutting portion and a leading edge projection that extends away from the shingle, wherein the lateral trailing edge includes at least one trailing abutting portion and a trailing edge projection that extends away from the shingle, wherein the roofing system comprises a plurality of courses of the shingles, and wherein the lateral trailing edge of a subsequently installed shingle in a course of shingles partially abuts and partially overlaps the lateral leading edge of an adjacent previously installed shingle in the same course of shingles to form an interlocking edge between adjacent shingles in the same course of shingles, and wherein the trailing edge projection has a weather edge, a rear edge, and a variable breadth that increases toward the rear edge of the trailing edge projection.

In another embodiment, the roofing system consists essentially of the shingles of the invention.

In a preferred embodiment, the at least one leading abutting portion includes a first leading portion and a second leading portion that are separated by the leading edge projection, the at least one trailing abutting portion includes a first trailing portion and a second trailing portion that are separated by the trailing edge projection, and the interlocking edge comprises a first abutment region defined by an abutment of the first leading portion and the first trailing portion of the adjacent shingles in the same course of shingles, a side-lap region defined by an overlap of the trailing edge projection and an underlap of the leading edge projection between the adjacent shingles in the same course of shingles, and a second abutment region defined by an abutment of the second leading portion and the second trailing portion of the adjacent shingles in the same course of shingles.

In a preferred embodiment, the trailing edge projection has a continuously curved profile. In a further preferred embodiment, the continuously curved profile is convex.

In another preferred embodiment, the trailing edge projection has a straight lateral portion. In a further preferred embodiment, the straight lateral portion has a constant breadth.

In a preferred embodiment, the variable breadth of the trailing edge projection includes a maximum breadth that is about 3 inches.

In another preferred embodiment, the constant breadth of the straight lateral portion of the trailing edge projection is about equal to the maximum breadth of the trailing edge projection.

In a preferred embodiment, the leading edge projection has a maximum breadth that is about equal to the maximum breadth of the trailing edge projection.

In a preferred embodiment, the trailing edge projection has a height that spans at least a portion of the headlap portion and at least a portion of the buttlap portion.

In a preferred embodiment, the leading edge projection has a height that is about equal to the height of the trailing edge projection.

In another preferred embodiment, the leading edge projection has a shape that mirrors the trailing edge projection.

In a further preferred embodiment, the first abutment region and the second abutment region of the interlocking edge each have a height of about 2 inches. In another preferred embodiment, the first abutment region has a height of about 1 inch and the second abutment region has a height of about 1½ inches.

In a preferred embodiment, the side-lap region has a maximum breadth that is about 6 inches.

In a preferred embodiment, the shingles further comprise an alignment means. In a particularly preferred embodiment, the alignment means includes sealant strips, a convergence point between the trailing edge projection and the first trailing portion, and a front edge of the leading edge projection.

In another preferred embodiment, the shingles have a non-straight longitudinal front edge. In a further preferred embodiment, the non-straight longitudinal front edge includes a central horizontal portion, a left horizontal portion, a right horizontal portion, a first transition portion, and a second transition portion, wherein the central horizontal portion extends further away from the shingle than the left horizontal portion and the right horizontal portion, and wherein the first transition portion is situated between the left horizontal portion and the central horizontal portion and the second transition portion is situated between the central horizontal portion and the right horizontal portion.

In a preferred embodiment, the shingles are cut from a sheet of roofing material and the shingles provide a coverage area such that the shingles required to cover 100 ft$^2$ of a roof deck are made from less than 200 ft$^2$ of the sheet of roofing material. In a further preferred embodiment, the shingles required to cover 100 ft$^2$ of the roof deck are made from less than 180 ft$^2$ of the sheet of roofing material. In a particularly preferred embodiment, the shingles required to cover 100 ft$^2$ of the roof deck are made from less than 168 ft$^2$ of the sheet of roofing material.

In a preferred embodiment, the roofing system of the invention provides a reduction in water infiltration area compared to a roofing system employing traditional 3-tab shingles as measured according to Miami Dade TAS 100 wind-driven test by at least 10%. In a further preferred embodiment, the reduction in water infiltration area is by at least 15%. In a particularly preferred embodiment, the reduction in water infiltration area is by at least 20%.

The roofing system of the invention is an improvement of roofing systems known in the art, wherein the improvements are providing roofing shingles having a reduced-width headlap and a unique shape and/or dimensions, which provide an increased coverage for each shingle of the invention compared to prior art shingles and allows for increased utilization of materials necessary to make the shingles of the invention compared to the amount of material necessary to make traditional, prior art shingles.

A further improvement is providing roofing shingles with interlocking edges that provide alignment means upon installation and increased resistance to infiltration by wind-driven rain. A further improvement is providing roofing shingles having a trailing edge projection with variable breadth that when installed on a roof deck in a side-lap fashion dissipates wind impingements at or near the side-lap region.

DETAILED DESCRIPTION OF THE FIGURES

For a more complete understanding of the present invention, and the advantages thereof, reference is now made to the following descriptions taken in conjunction with the accompanying figures, but which are not to be construed as limiting the scope of the present invention as defined by the appended claims, in which:

DETAILED DESCRIPTION

The preferred embodiments of the present invention and its advantages are best understood by referring to FIGS. 1 through 11, like numerals being used for like and corresponding parts of the various drawings.

The first embodiment of the present invention, which relates to single-layer roofing shingles having a trailing edge projection with variable breadth that, when installed in a side-lap (or shiplap) fashion, dissipates wind-impingements at or near the side-lap, will now be described in greater detail by referring to the drawings that accompany the present application.

Figure 1:
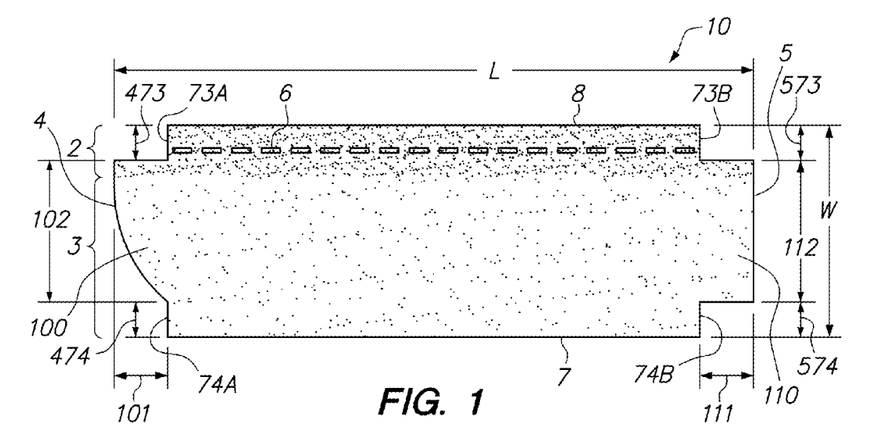
FIG. 1 shows a top plan view of an exemplary embodiment of a roofing shingle of the present invention.
Figure 2:
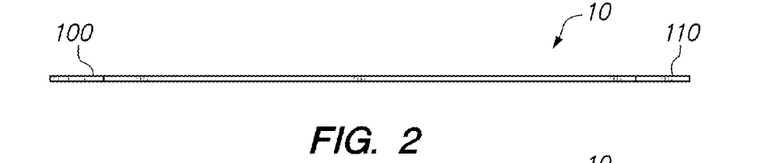
FIG. 2 shows a front elevation view of the exemplary embodiment of the roofing shingle of the present invention depicted in FIG. 1.
Figure 3:
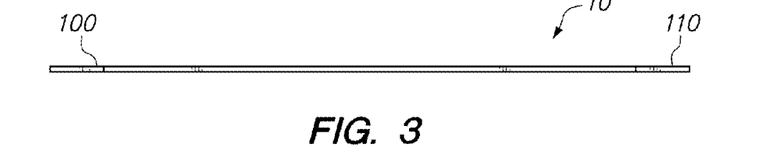
FIG. 3 shows a rear elevation view of the exemplary embodiment of the roofing shingle of the present invention depicted in FIG. 1.
Figure 4A:
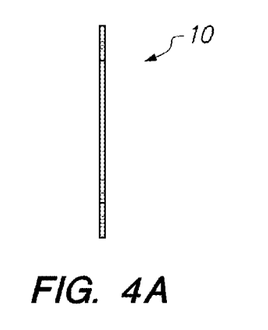
FIG. 4A shows a left side view of the exemplary embodiment of the roofing shingle of the present invention depicted in FIG. 1.
Figure 4B:
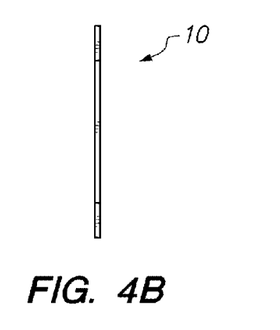
FIG. 4B shows a right side view of the exemplary embodiment of the roofing shingle of the present invention depicted in FIG. 1.
Figure 7:
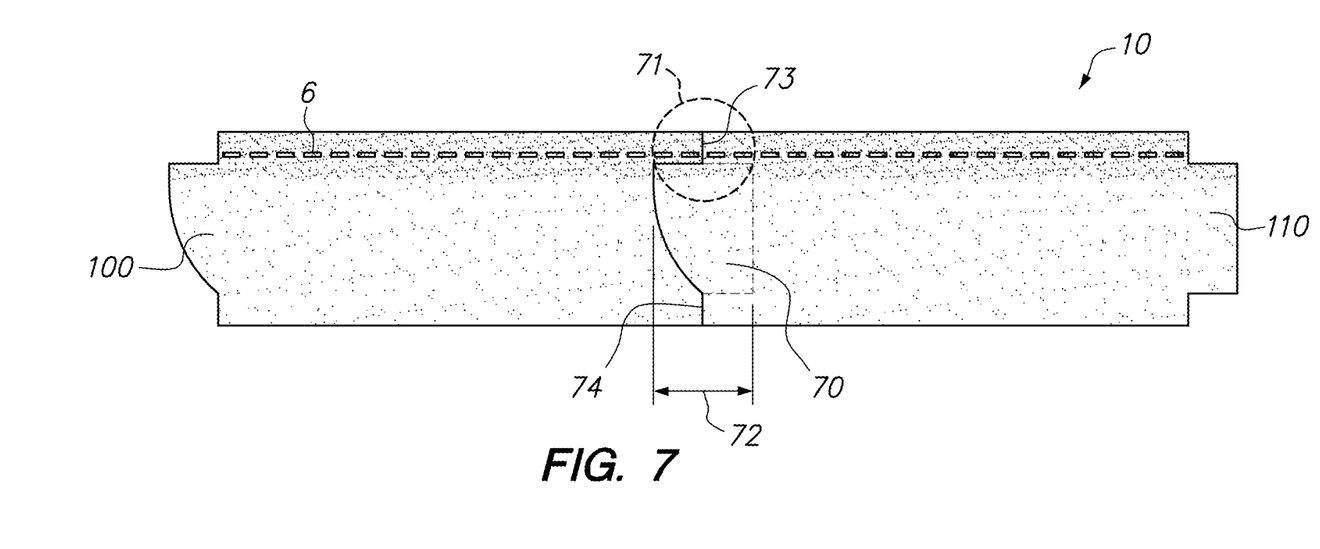
FIG. 7 shows a top plan view of an exemplary embodiment of a roofing system of the present invention incorporating the exemplary embodiment of the roofing shingle of the present invention depicted in FIG. 1, wherein two shingles are arranged in the same course, and illustrating overlapped portions of the shingles in broken lines.
Figure 8:
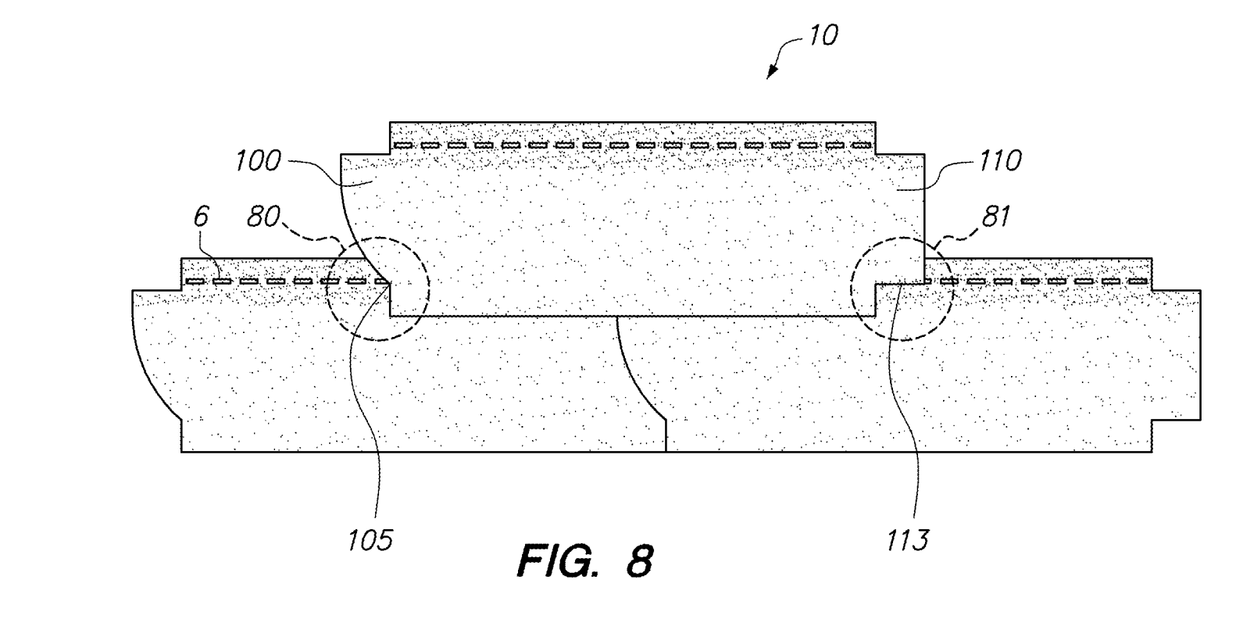
FIG. 8 shows a top plan view of an exemplary embodiment of a roofing system of the present invention incorporating the exemplary embodiment of the roofing shingle of the present invention depicted in FIG. 1, wherein a third shingle is arranged in a subsequent course overlapping a previously installed course of shingles.

A shingle 10 incorporating one embodiment of the present invention is shown in FIGS. 1-9. FIG. 1 illustrates a top plan view of shingle 10. Shingle 10 has a width (w) and a length (l). Shingle 10 comprises a headlap portion 2, a buttlap portion 3, a front longitudinal edge 7, a rear longitudinal edge 8, a lateral leading edge 5, and a lateral trailing edge 4. Lateral leading edge 5 may include a first leading portion 74B, a leading edge projection 110, and a second leading portion 73B. Lateral trailing edge 4 may include a first trailing portion 74A, a trailing edge projection 100, and a second trailing portion 73A. When installed on a roof deck, as illustrated in FIG. 8, the headlap portion 2 of a previously installed shingle 10 is covered by at least a portion of the buttlap portion 3 of a subsequently installed shingle 10 and, as illustrated in FIG. 7, the trailing edge projection 100 of subsequently installed shingle 10 overlaps (i.e., side-laps) a portion of a previously installed shingle 10. It will further be appreciated that the leading edge projection 110 of previously installed shingle 10 underlaps a portion of subsequently installed shingle 10.

Figure 5:
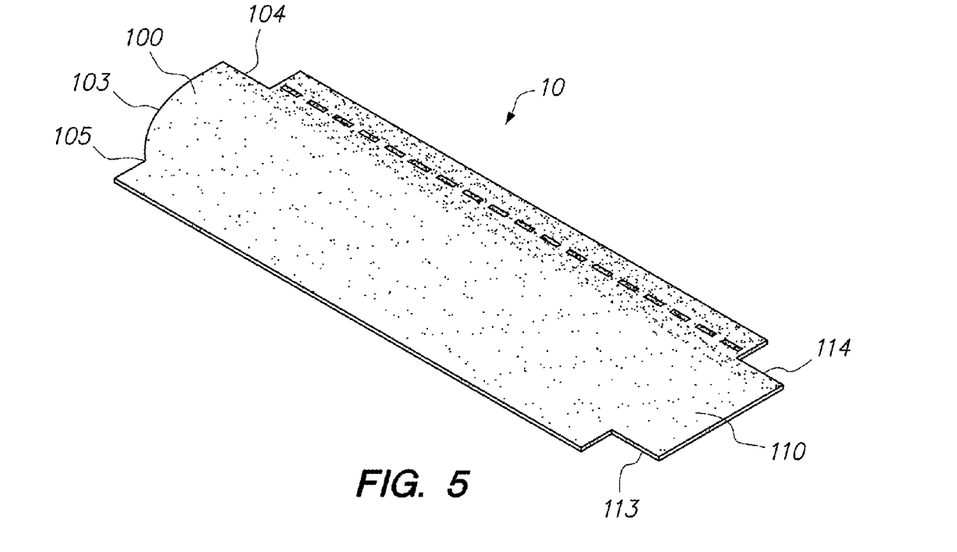
FIG. 5 shows a perspective view of the exemplary embodiment of the roofing shingle of the present invention depicted in FIG. 1.
Figure 6:
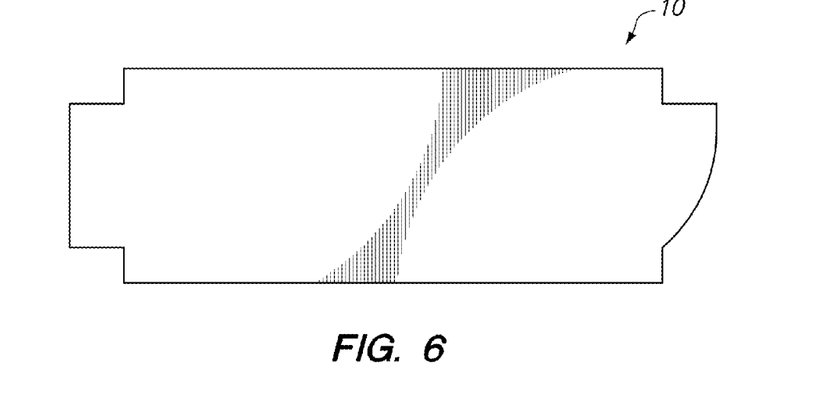
FIG. 6 shows a bottom plan view of the exemplary embodiment of the roofing shingle of the present invention depicted in FIG. 1.

Referring to FIGS. 1 and 5, trailing edge projection 100 has a weather edge 103, a rear edge 104, a maximum breadth 101, and a height 102, and is situated between a first trailing portion 74A and a second trailing portion 73A. Preferably, when shingle 10 is installed in accordance with the instant invention, at least a portion of the weather edge 103 of trailing edge projection 100 is exposed to weather and the rear edge 104 of trailing edge projection 100 is covered by a subsequently installed shingle in a subsequent course of shingles. Preferably, the maximum breadth 101 may be between 1 and 5 inches, and more preferably about 3 inches. Preferably, the height 102 may be between 50% and 75% of the width (w) of shingle 10, and more preferably about 67% of the width (w) of shingle 10. Trailing edge projection 100 further has a variable breadth (measured transversely across the trailing edge projection 100 along a line parallel to the longitudinal axis of shingle 10) that increases toward the rear edge 104 of the trailing edge projection 100. In this embodiment, the trailing edge projection 100 has continuously curved and convex profile and the variable breadth of the trailing edge projection 100 ranges from 0 inches to the maximum breadth 101. In another embodiment, the trailing edge projection may have a straight lateral portion, see, e.g., FIG. 10, feature 102*x*, which may have a constant breadth.

To improve wind resistance, an edge of the side-lap shingle (i.e., the weather edge 103 of the trailing edge projection 100) should be designed in such a way as to optimize the aerodynamic performance of the shingle geometry, such that the propensity of wind uplift at the side-lap corner (or trailing projection 100) is highly reduced or eliminated. An example may comprise a side-lap edge (or a trailing projection 100) having a continuously curved shape that dissipates wind impingements and greatly improves wind performance of a side-lap area.

Leading edge projection 110 has a front edge 113, a rear edge 114, a maximum breadth 111, and a height 112, and is situated between a first leading portion 74B and a second leading portion 73B. Preferably, the maximum breadth 111 may be between 2 and 5 inches, and more preferably about 3 inches. Preferably, height 112 is between 50% and 75% of the width (w) of shingle 10, and more preferably about 67% of the width (w) of shingle 10. In a particularly preferred embodiment, the maximum breadth 111 of the leading edge projection 110 is about equal to the maximum breadth 101 of the trailing edge projection 100 and the height 112 of the leading edge projection 110 is about equal to the height 102 of the trailing edge projection 100. In another preferred embodiment, the leading edge projection 110 may have a variable breadth. In particular, referring to FIG. 10, a further preferred embodiment has a leading edge projection 110' with a shape that mirrors the shape of trailing edge projection 100'. It is also contemplated that the leading edge projection 110 may have a continuously curved and concave profile (not shown).

Headlap portion 2 has a width measured laterally across shingle 10 that is less than the width of the buttlap portion 3 measured laterally across shingle 10 defining a reduced-width headlap. Preferably, the width of the headlap portion 2 may be between 15% and 50% of the width (w) of the shingle 10, and more preferably 25% of the width (w) of the shingle 10. Headlap portion 2 may include sealant strips 6.

As depicted in the embodiment shown in FIGS. 1-9, shingle 10 of the invention may have a front longitudinal edge 7 that is straight. However, the front longitudinal edge of the shingle of the invention may also be non-straight. Referring to FIG. 10, in another preferred embodiment, shingle 10' of the invention may have a non-straight longitudinal front edge 7' that has a central horizontal portion 7*x*, a left horizontal portion 7*z*, a right horizontal portion, a first transition portion 7*y*, and a second transition portion, wherein the central horizontal portion extends further away from the shingle than the left horizontal portion and the right horizontal portion (as identified as dimension 7*w*), and wherein the first transition portion is situated between the left horizontal portion and the central horizontal portion and the second transition portion is situated between the central horizontal portion and the right horizontal portion.

As depicted in the accompanying figures, shingle 10 may have an undivided buttlap. However, the instant invention is not limited to the above-described embodiments. The principles of the instant invention may further be employed in laminated shingles (not shown).

FIG. 7 depicts a particularly preferred roofing system embodiment of the present invention, wherein two shingles 10 of the invention are installed as they would be applied to a roof deck in the same course, such that the trailing edge projection 100 of a subsequently installed shingle 10 overlaps a portion of a previously installed shingle 10 providing a first part of side-lap region 70 and the leading edge projection 110 of a previously installed shingle 10 is underneath (or underlaps) a portion of a subsequently installed shingle 10 providing a second part of side-lap region 70, wherein side-lap region 70 has a maximum breadth 72. It will be appreciated that the maximum breadth 72 of the side-lap region 70 is equivalent to the sum of the maximum breadth 101 of the trailing edge projection 100 and the maximum breadth 111 of the leading edge projection 110.

Preferably, as depicted in FIG. 7, two shingles 10 of the invention partially abut each other at a first abutment region 74 and a second abutment region 73. Referring back to FIG. 1, shingle 10 of the invention has a first trailing portion 74A that, when installed as in FIG. 7, abuts a first leading portion 74B of a previously installed shingle in the same course to define the first abutment region 74. Shingle 10 of the invention also has a second trailing portion 73A that, when installed as in FIG. 7, abuts a second leading portion 73B of a previously installed shingle in the same course to define the second abutment region 73.

Referring back to FIG. 1, the first trailing portion 74A has a height 474 and the first leading portion 74B has a height 574; and second trailing portion 73A has a height 473 and second leading portion 73B has a height 573. In a preferred embodiment, heights 474, 574 of first trailing portion 74A and first leading portion 74B, respectively, are about equal and may be between 0.5 and 4 inches, and more preferably are 2 inches. In another preferred embodiment, heights 474, 574 are preferably 1 inch. In a further preferred embodiment, heights 473, 573 of second trailing portion 73A and second leading portion 73B, respectively, are about equal and may be between 1 and 4 inches, and more preferably are 2 inches. In another preferred embodiment, heights 473, 573 are preferably 1½ inches. In a particularly preferred embodiment, heights 474, 574, 473, 573 are about equal.

Preferably, shingle 10 of the invention further comprises an alignment means. As depicted in FIG. 7, shingle 10 may further include sealant strips 6 that operate as an alignment means, wherein the sealant strips 6 on a previously installed shingle 10 and the sealant strips 6 on a subsequently installed shingle create a straight line that continues across a same elevation alignment region 71 that spans adjacent shingles in the same course.

FIG. 8 depicts an alignment means between a shingle 10 of the invention in a subsequently installed course of shingles and two shingles 10 of the invention in a previously installed or first course of shingles. In the first course, two shingles 10 of the invention are installed, as depicted in FIG. 7. A third shingle 10 of the invention is installed in a subsequent course and overlaps the headlap portions 2 of the shingles 10 of the invention in the first course. A convergence point 105 between the trailing edge projection 100 and the first trailing portion 74A of shingle 10 in the invention in the subsequent course aligns with the sealant strips 6 of a shingle 10 of the invention in the first course defining a trailing course alignment region 80. The front edge 113 of the leading edge projection 110 of shingle 10 of the invention in the subsequent course aligns with the sealant strips 6 of a shingle 10 of the invention in the first course defining a leading course alignment region 81. In this embodiment, the front edge 113 of leading edge projection 110 is about flush with the front edge of the sealant strips 6 of shingle 10 in the first course. However, referring to FIGS. 10 and 11, shingle 10' in the subsequent course may have a leading edge projection 110' with a particular shape such that leading edge projection 110' does not cover sealant strips 6' of shingle 10' in the first course. Additionally, the embodiment shown in FIGS. 10 and 11 has a non-straight longitudinal front edge 7' with a front edge portion (e.g., feature 7z) that is about flush with the front edge of sealant strips 6' of a shingle 10B'. Although the accompanying figures depict sealant strips 6 arranged in clean straight lines, it will be appreciated that the actual sealant strips placed onto the shingles may not have a perfectly straight line appearance; however, the alignment principles disclosed herein are still applicable. Additional means of aligning subsequently installed shingles to the sealant strips 6, 6' are also contemplated, such as alignment notches or marks on the lateral edges of subsequently installed shingles.

Figure 9:
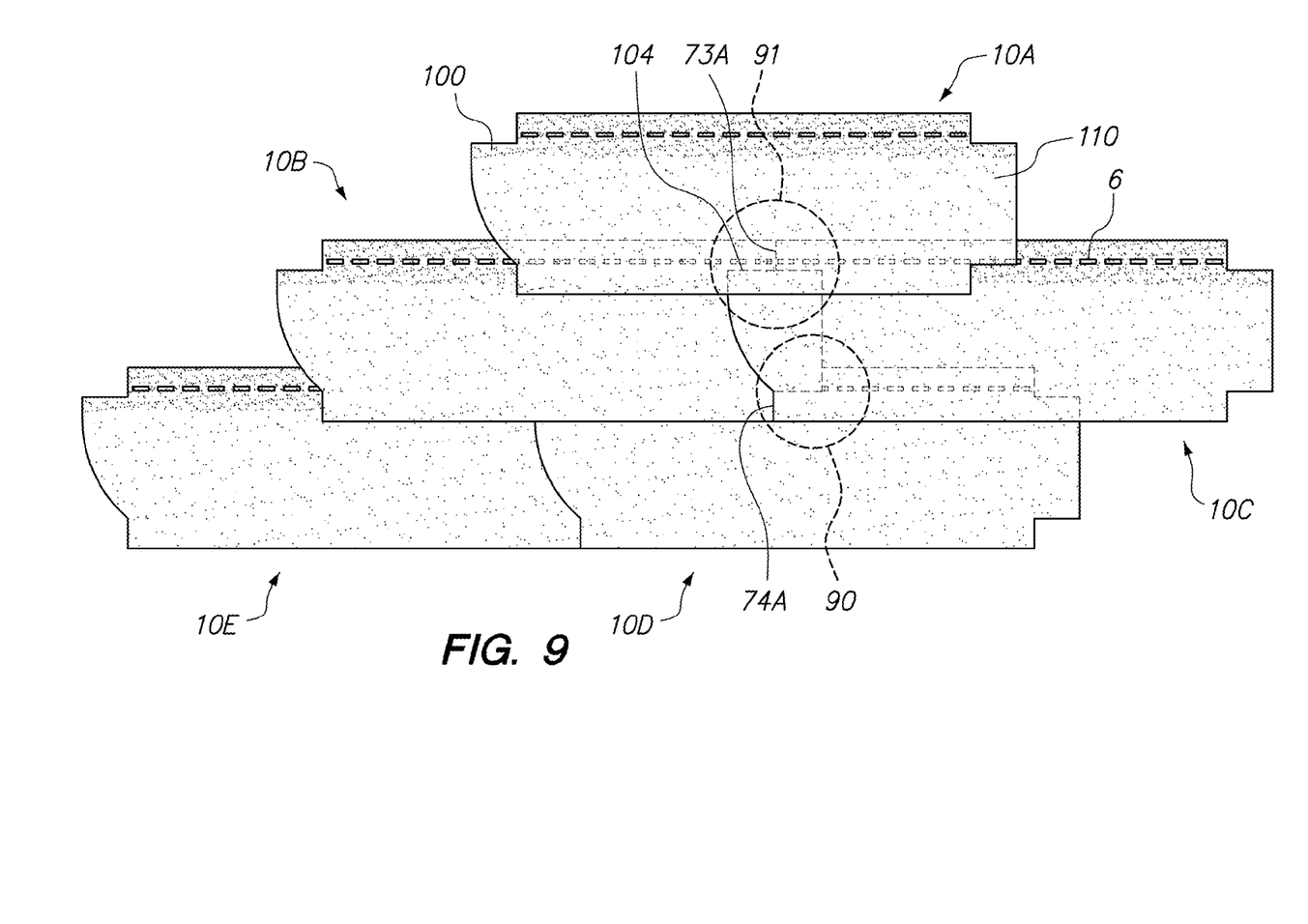
FIG. 9 shows a top plan view of an exemplary embodiment of a roofing system of the present invention incorporating the exemplary embodiment of the roofing shingle of the present invention depicted in FIG. 1, wherein five shingles are arranged in three overlapping courses, and illustrating overlapped portions of the shingles in broken lines.
Figure 10:
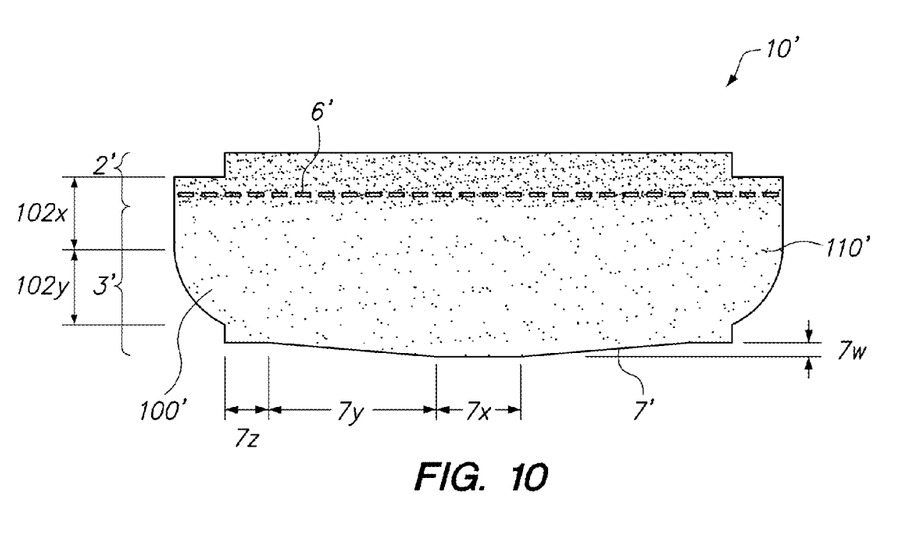
FIG. 10 shows a top plan view of another exemplary embodiment of a roofing shingle of the present invention.
Figure 11:
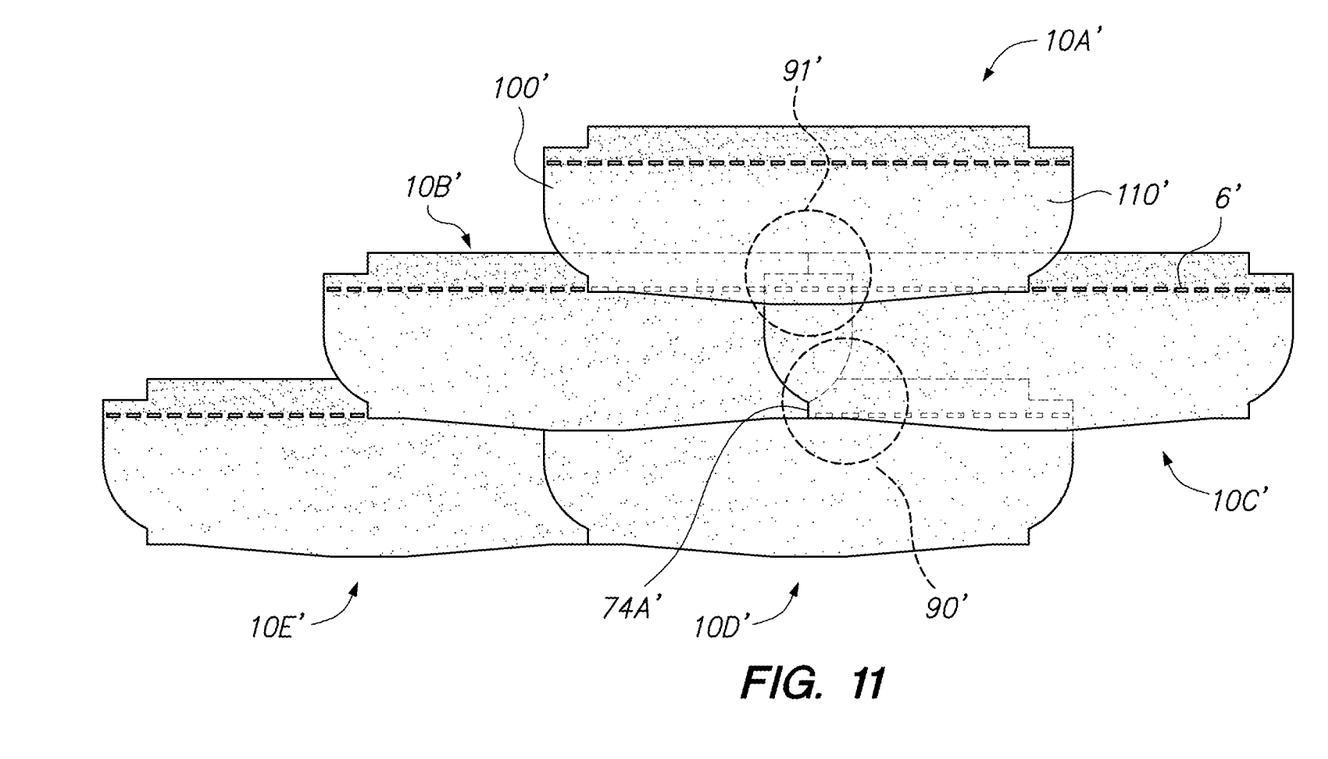
FIG. 11 shows a top plan view of an exemplary embodiment of a roofing system of the present invention incorporating the exemplary embodiment of the roofing shingle of the present invention depicted in FIG. 10, wherein five shingles are arranged in three overlapping courses, and illustrating overlapped portions of the shingles in broken lines.
Figure 12:
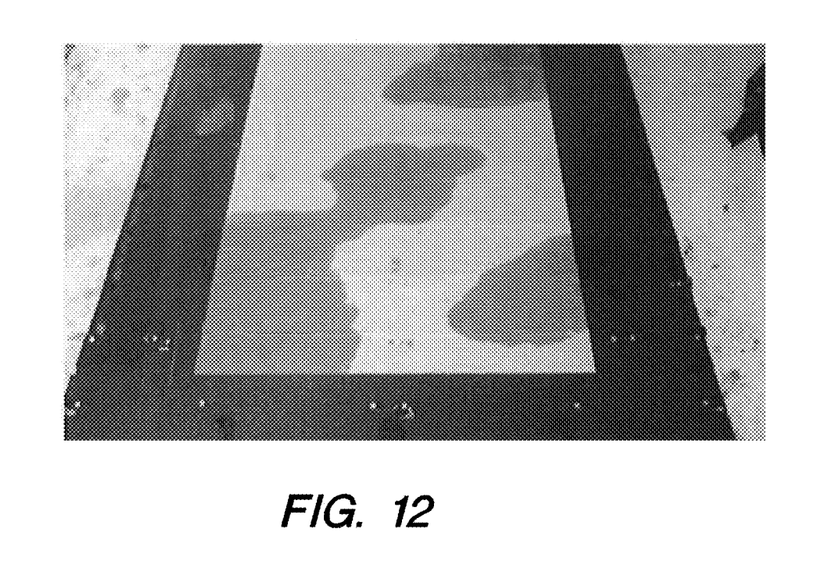
FIG. 12 shows a test roof deck after removal of 3-tab prior art shingles that were subjected to Miami Dade TAS 100 wind-driven test.
Figure 13:
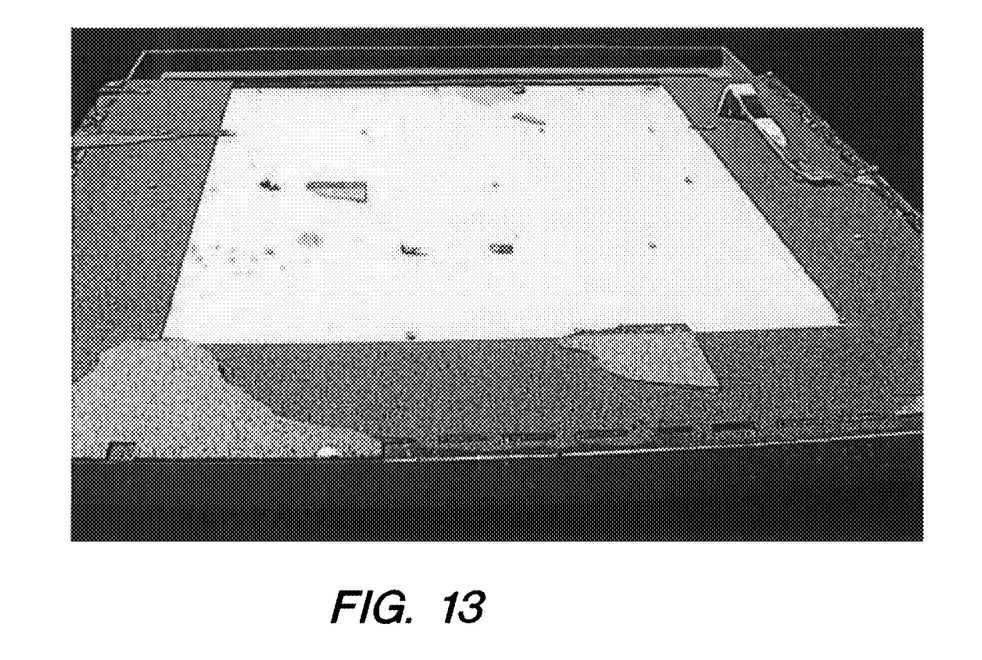
FIG. 13 shows a test roof deck after removal of shingles of the invention that were subjected to Miami Dade TAS 100 wind-driven test.

FIG. 9 depicts an arrangement of, and a relationship between, five shingles of the invention 10A, 10B, 10C, 10D, and 10E of the invention as installed in a particularly preferred roofing system embodiment, wherein the shingles are installed in three courses. In the first course, two shingles 10E and 10D of the invention are installed, as depicted in FIG. 7. Shingle 10B of the invention is installed in a second course, as depicted in FIG. 8. Shingle 10C of the invention is also installed in the second course with an illustrated overlap of headlap portion of shingle 10D of the invention and a sidelap of shingle 10B. In a third course, a portion of shingle 10A of the invention is installed over shingles 10B and 10C of the invention.

Referring to FIGS. 1 and 9, a portion of the underside near the front longitudinal edge 7 of shingle 10C of the invention is sealed to shingle 10D of the invention at sealant strips 6 of shingle 10D of the invention. At a first trailing overlap region 90, the underside of shingle 10C near the first trailing portion 74A of shingle 10C is not sealed to sealant strips 6 of shingle 10D because the leading edge projection 110 of shingle 10B is sealed to shingle 10D at sealant strips 6 in this region. However, the sealed leading edge projection 110 of shingle 10B provides disruption to a water pathway (e.g., for wind-driven rain) underneath the front trailing corner of shingle 10C. In another embodiment, and referring to FIGS. 10 and 11, at a first trailing overlap region 90', the underside of shingle 10C' near the first trailing portion 74A' of shingle 10C' is sealed to sealant strips 6' of shingle 10D'.

Referring back to FIGS. 1 and 9, at a second trailing overlap region 91, the upper side of shingle 10C near the second trailing portion 73A of shingle 10C is sealed to shingle 10A at sealant strips 6 of shingle 10C. Shingle 10A is also continuously sealed at sealant strips 6 of shingle 10B across the second trailing overlap region 91. Since shingle 10A is uniformly sealed across the second trailing overlap region 91, it will be appreciated that shingle 10A operates to secure the rear edge 104 of the unsealed trailing edge projection 100 of shingle 10C. In another embodiment, and referring to FIGS. 10 and 11, the trailing edge projection 100' may be sealed directly to sealant strips 6' of a subsequently installed shingle 10' at the second trailing overlap region 91'.

In a particularly preferred embodiment of the roofing system of the invention, shingles of the invention may be installed such that a minimum of 4 inches of a sidelap overlap exists at any water entry point.

For one embodiment of the present invention, the shingle 10 may be formed from a fiberglass mat (not shown) with an asphalt coating on both sides of the mat. If desired, the present invention may also be used with shingles formed from organic felt or other types of base material, including but not limited to synthetic mats or synthetic glass/hybrid mats having an appropriate coating. Nonlimiting embodiments of coatings include asphalt and modified bituminous coatings based on atactic polypropylene (APP), styrene-butadiane-styrene (SBS), styrene-ethylene-butadiene-styrene (SEBS), amorphous polyalpha olefin (APAO), thermoplastic polyolefin (TPO), synthetic rubber, their combinations or other asphaltic modifiers.

Referring to FIG. 1, the exposed outer surface or weather surface, i.e., the buttlap portion 3 of shingle 10 of the invention, may be coated with various types of mineral granules to protect the asphalt coating, to add color to shingle 10 of the invention and to provide fire resistance. For some applications, ceramic-coated mineral granules may be disposed on the top surface of the buttlap portion 3. Also, a wide range of mineral colors from white and black to various shades of red, green, brown and any combination thereof may be used to provide a roof having the desired color for shingle 10 of the invention. In other embodiments, the entire outer surface of shingle 10 of the invention may be coated with any of the aforementioned coatings. In further embodiments, e.g., shingles having a tabbed buttlap with slots, the headlap portion 2 of shingle 10 of the invention may be coated with coatings that contrast with coatings applied to the buttlap portion 3 of shingle 10 of the invention. The underside of shingle 10 of the invention may be coated with various inert minerals with sufficient consistency to seal the asphalt coating.

An important feature of the present invention includes providing a shingle having a reduced-width headlap portion. For the embodiment of the present invention shown in FIGS. 1-9, headlap portion 2 has a width that is about 25% of the width (w) of shingle 10 of the invention. However, as noted above, the headlap portion 2 may have a width that is between 15% and 50% of the width (w) of shingle 10 of the invention.

Another important feature of the present invention includes providing a shingle having with interlocking edges. For the embodiment of the present invention shown in FIGS. 1-9, the lateral trailing edge 4 and the lateral leading edge 5 of adjacent installed shingles in the same course partially overlap, partially underlap, and partially abut, thereby forming an interlocking edge between the adjacent installed shingles. However, other forms of interlocking edges are contemplated including, but not limited to, cutouts or holes in various geometric shape and their combinations.

Another important feature of the present invention includes providing a shingle with a side-lap edge (a trailing edge projection 100) having a variable breadth that increases toward a rear edge of the trailing edge projection. For the embodiment of the present invention shown in FIGS. 1-9, trailing edge projection 100 has a continuously curved shaped. However, other shapes and dimensions for the trailing edge projection 100 that dissipate wind impingements underneath the side-lap edge are contemplated and within the scope of the present invention, e.g., the embodiment of the present invention shown in FIGS. 10 and 11 has a trailing edge projection 100' having a straight portion 102x and a curved portion 102y.

The reduced-width headlap portion and the unique shape and/or dimensions of the shingle of the present invention are desirable because they allow for an improved utilization of materials that are required to make the shingles. In preferred embodiments of this invention, the shingles and roof system of the present invention improve the material utilization over traditional, prior art 3-tab shingles preferably by 15% (less than 200 ft$^2$ of material needed for 100 ft$^2$ of coverage), more preferably by 25% (less than 180 ft$^2$ of material needed for 100 ft$^2$ of coverage), and even more preferably by 30% (less than 168 ft$^2$ of material sheet needed for 100 ft$^2$ of coverage).

The interlocking edges of the present invention are desirable for improving alignment upon installation and increased resistance to water infiltration.

The trailing edge projection 100 having a variable breadth that increases toward a rear edge of the trailing edge projection of the present invention is desirable for increasing resistance to wind impingements at or near the side-lap region.

The interlocking edges and the trailing edge projection 100 of the present invention are further desirable because they allow for improved weather performance. In preferred embodiments of this invention, the shingles and roofing system of the present invention reduce the % area of water infiltration over traditional, prior art 3-tab shingles by at least 10%, and more preferably by at least 15%, and yet more preferably by 20%. The % area of water infiltration is determined by the area of water wetting in the underlayment upon testing per Miami Dade TAS 100 wind-driven rain test.

EXAMPLE

Shingles having length (l) and width (w) dimensions of 36"×12" and the geometric shape as the one shown in FIG. 1 were prepared by following a typical reduced-headlap shingle production. A 4'×4' test roof deck was constructed, wherein shingles of the invention were installed in accordance with the invention. The interlocking edge between adjacent shingles in the same course included a side-lap region having a maximum length of 6" and a first abutment region and a second abutment region each having a height of 2". The weather edge of the sidelap included a curved edge designed to provide wind dynamics for uplift reduction. A 4'×4' control roof deck was constructed, wherein commercially available 3-tab shingles (Royal Sovereign shingle from GAF Corporation, Dallas, Tex.) were installed. Table 1 (below) lists the amount of shingle material needed per 100 ft$^2$ based upon the deck construction calculation. As will be appreciated, the shingles of the invention have significantly better material utilization with an approximately 33% reduction in material usage comparing to the prior art, control 3-tab shingles.

Both decks were then subjected to the Miami Dade TAS 100 wind-driven rain test, which includes wind-driven rain conditions at 35, 70, 90, and 110 mph wind. After the test, the shingles were removed and the water infiltration was observed. The amounts of wet area were recorded and estimated to within ±5% of the total area, and listed in Table 1 (below). As will be appreciated, the shingles of the invention can significantly reduce the amount of water infiltration when compared to traditional, prior art 3-tab shingles.

TABLE 1

| Sample | Area needed to cover 100 ft$^2$ | % area of water infiltration |
| --- | --- | --- |
| Control: 3-tab shingles | 240 | 20% |
| Test sample | 160 | 5% |

Although the present invention and its advantages have been described in detail, it should be understood that various changes, substitutions and alterations can be made therein without departing from the spirit and scope of the invention as defined by the appended claims.

What is claimed is:

1. A roofing system comprising:
   single-layer shingles having a headlap portion, a buttlap portion, a lateral leading edge, and a lateral trailing edge;
   wherein said headlap portion has a maximum headlap width that is less than a maximum buttlap width of said buttlap portion;
   wherein said lateral leading edge includes at least one leading abutting portion and a leading edge projection that extends away from the shingle;
   wherein said lateral trailing edge includes at least one trailing abutting portion and a trailing edge projection that extends away from the shingle;
   wherein the roofing system comprises a plurality of courses of the shingles, and wherein the lateral trailing edge of a subsequently installed shingle in a first course of shingles partially abuts and partially overlaps the lateral leading edge of an adjacent previously installed shingle in the first course of shingles to form an interlocking edge between adjacent shingles in the first course of shingles;
   and wherein the trailing edge projection has a weather edge, a rear edge, and a variable breadth that increases toward the rear edge of the trailing edge projection.

2. The roofing system according to claim 1, wherein the at least one leading abutting portion includes a first leading portion and a second leading portion that are separated by the leading edge projection;
   wherein the at least one trailing abutting portion includes a first trailing portion and a second trailing portion that are separated by the trailing edge projection;
   and wherein the interlocking edge comprises a first abutment region defined by an abutment of the first leading portion and the first trailing portion of the adjacent shingles in the first course of shingles, a side-lap region defined by an overlap of the trailing edge projection and an underlap of the leading edge projection between the adjacent shingles in the first course of shingles, and a second abutment region defined by an abutment of the second leading portion and the second trailing portion in the first course of shingle.

3. The roofing system according to claim 2, wherein the first abutment region and the second abutment region each have a height of about 2 inches.

4. The roofing system according to claim 2, wherein the first abutment region has a height of about 1 inch and the second abutment region has a height of about 1½ inches.

5. The roofing system according to claim 2, wherein the side-lap region has a maximum breadth that is about 6 inches.

6. The roofing system according to claim 1, wherein the trailing edge projection has a continuously curved profile.

7. The roofing system according to claim 1, wherein the trailing edge projection has a straight lateral portion.

8. The roofing system according to claim 7, where the straight lateral portion has a constant breadth.

9. The roofing system according to claim 8, wherein the variable breadth of the trailing edge projection includes a maximum breadth that is about equal to the constant breadth of the straight lateral portion.

10. The roofing system according to claim 1, wherein the variable breadth of the trailing edge projection includes a maximum breadth that is about 3 inches.

11. The roofing system according to claim 1, wherein the leading edge projection has a maximum breadth that is about equal to the maximum breadth of the trailing edge projection.

12. The roofing system according to claim 1, wherein trailing edge projection has a height that spans at least a portion of the headlap portion and at least a portion of the buttlap portion.

13. The roofing system according to claim 1, wherein the leading edge projection has a height that is about equal to the height of the trailing edge projection.

14. The roofing system according to claim 1, wherein the leading edge projection has a shape that mirrors the trailing edge projection.

15. The roofing system according to claim 1, wherein the shingles further comprise an alignment means.

16. The roofing system according to claim 15, wherein the alignment means includes sealant strips, a convergence point between the trailing edge projection and the first trailing portion, and a front edge of the leading edge projection.

17. The roofing system according to claim 1, wherein the shingles have a non-straight longitudinal front edge.

18. The roofing system according to claim 17, wherein the non-straight longitudinal front edge includes a central horizontal portion, a left horizontal portion, a right horizontal portion, a first transition portion, and a second transition portion, wherein the central horizontal portion extends further away from the shingle than the left horizontal portion and the right horizontal portion, and wherein the first transition portion is situated between the left horizontal portion and the central horizontal portion and the second transition portion is situated between the central horizontal portion and the right horizontal portion.

19. The roofing system according to claim 1, wherein the shingles are cut from a sheet of roofing material and wherein the shingles provide a coverage area such that the shingles required to cover 100 ft$^2$ of a roof deck are made from less than 200 ft$^2$ of the sheet of roofing material.

20. The roofing system according to claim 19, wherein the shingles required to cover 100 ft$^2$ of the roof deck are made from less than 180 ft$^2$ of the sheet of roofing material.

21. The roofing system according to claim 20, wherein the shingles required to cover 100 ft$^2$ of the roof deck are made from less than 168 ft$^2$ of the sheet of roofing material.

22. A roofing shingle comprising:
a headlap portion, a buttlap portion, a lateral leading edge, and a lateral trailing edge;
wherein said shingle is a single-layer shingle;
wherein said headlap portion has a maximum headlap width that is less than a maximum buttlap width of said buttlap portion;
wherein said lateral leading edge includes at least one leading abutting portion and a leading edge projection that extends away from the shingle;
wherein said lateral trailing edge includes at least one trailing abutting portion and a trailing edge projection that extends away from the shingle;
and wherein the trailing edge projection has a weather edge, a rear edge, and a variable breadth that increases toward the rear edge of the trailing edge projection.

23. The roofing shingle according to claim 22, wherein the at least one leading abutting portion includes a first leading portion and a second leading portion that are separated by the leading edge projection;
and wherein the at least one trailing abutting portion includes a first trailing portion and a second trailing portion that are separated by the trailing edge projection.

24. The roofing shingle according to claim 22, wherein the trailing edge projection has a continuously curved profile.

25. The roofing shingle according to claim 22, wherein the trailing edge projection has a straight lateral portion.

26. The roofing shingle according to claim 25, where the straight lateral portion has a constant breadth.

27. The roofing shingle according to claim 26, wherein the variable breadth of the trailing edge projection includes a maximum breadth that is about equal to the constant breadth of the straight lateral portion.

28. The roofing shingle according to claim 22, wherein the variable breadth of the trailing edge projection includes a maximum breadth that is about 3 inches.

29. The roofing shingle according to claim 22, wherein the leading edge projection has a maximum breadth that is about equal to the maximum breadth of the trailing edge projection.

30. The roofing shingle according to claim 22 wherein the trailing edge projection has a height that spans at least a portion of the headlap portion and at least a portion of the buttlap portion.

31. The roofing shingle according to claim 22, wherein the leading edge projection has a height that is about equal to the height of the trailing edge projection.

32. The roofing shingle according to claim 22, wherein the leading edge projection has a shape that mirrors the trailing edge projection.

33. The roofing shingle according to claim 22, wherein the shingles further comprise an alignment means.

34. The roofing system according to claim 22, wherein the shingles have a non-straight longitudinal front edge.

35. The roofing system according to claim 34, wherein the non-straight longitudinal front edge includes a central horizontal portion, a left horizontal portion, a right horizontal portion, a first transition portion, and a second transition portion, wherein the central horizontal portion extends further away from the shingle than the left horizontal portion and the right horizontal portion, and wherein the first transition portion is situated between the left horizontal portion and the central horizontal portion and the second transition portion is situated between the central horizontal portion and the right horizontal portion.

* * * * *